United States Patent Office 3,201,990
Patented Aug. 24, 1965

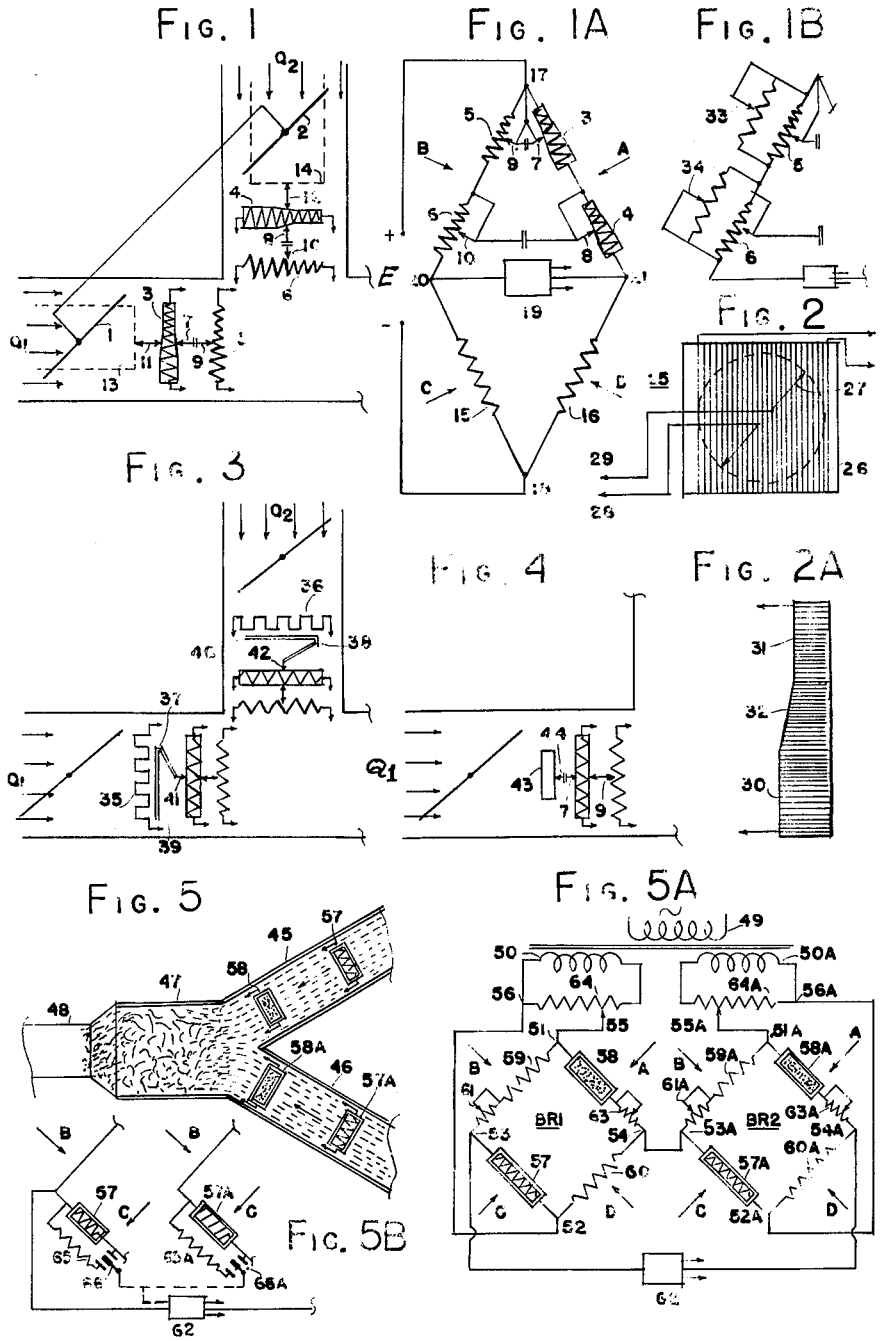

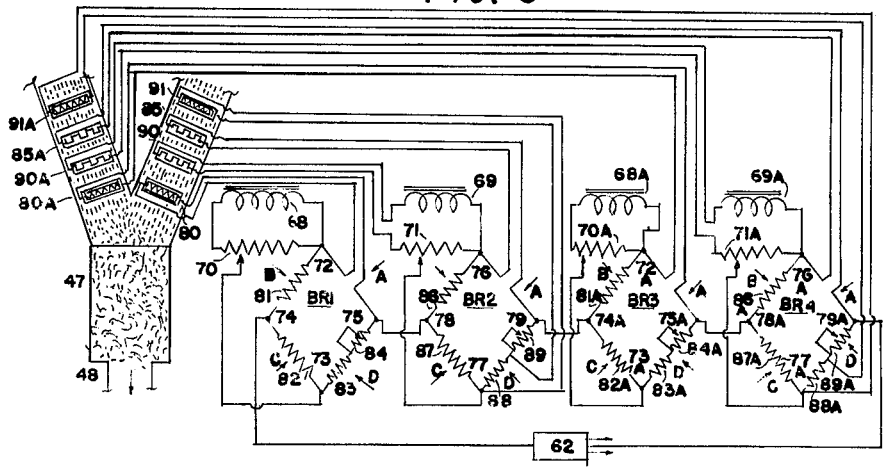

3,201,990
ELECTRIC MEASURING DEVICE FOR MIXED FLUID TEMPERATURE AND VELOCITY
Herman Wald, Astoria, N.Y.
(97—11 Horace Harding Expressway, Queens 68, N.Y.)
Filed June 30, 1960, Ser. No. 40,065
4 Claims. (Cl. 73—342)

This invention relates to further improvements on the novel method of measuring the exact average temperature of air mixtures having variable quantities of non-linear variability being operated by the outdoor and recirculated air dampers in heating and air conditioning systems, as described in my copending application Serial No. 687,750, filed October 2, 1957, now Patent No. 2,944,422 issued July 12, 1960. This application is, therefore, a continuation-in-part of my above named copending application and is generally extended to all types of gases for measuring the exact average temperature and velocity of the mixtures.

As it has been pointed out, the difficulty in measuring the exact mixed temperature of two damper controlled air streams arises from the fact that as the dampers close the condition of stratification in the mixing compartment changes from position to position. Consequently there is a steady variable condition of air stratification which, in turn, makes it difficult to find a representative location of the thermostat measuring the accurate average temperature as the case is with inversely operated fresh and return air dampers.

The measuring of the mixed temperature has been accomplished, as described in the above named application, by a Wheatstone bridge circuit arrangement having a pair of cooperating temperature responsive resistances in series connected with one arm of the bridge and each of which is directly exposed to the air streams. Also slider contact arms have been adapted to above said resistance elements to be actuated by the cooperating dampers to adjust the relative distribution of the length of said temperature responsive resistances to be in strict accordance with the relative proportion of the respective volumes of said air streams under any position of the cooperating damper systems by the application of some interlocking means.

For this purpose the damper system has been arranged to comprise parallel blades in such manner as to exhibit a linear variability of the free area of both inversely operated dampers to secure a constant total volume of both air streams to be discharged under any position of the angular run of said dampers.

In exact measuring, however, more difficulty has been experienced when the single blade type dampers exhibit a non-linear variability or sinusoidal variation of the free area causing the sum of both air volumes to vary with the angular run. Thus some control means must be employed to actuate the setting of the sliders as required to produce a displacement of the cooperating sliders such as to render operative a length of each of the series resistances having a ratio to be in strict correspondence with the relative proportion of said air quantities under any position of the dampers.

Also the further improvements described herein contemplate the provision of means controlling or adjusting the settings or cooperating values of said series resistances measuring the average temperature without any moving parts or elements, thereby to simplify the method of operation.

The main object of this invention is, therefore, the provision of various control means operating in response to changes in the volume distribution of both air or gas-streams, thereby to provide a corresponding adjustment of the temperature responsive resistance elements in series with the bridge-arm arrangement as required for accurate measurements to make its ratio to correspond to the ratio of said gas streams or their volumes.

Another object of the invention is to provide such temperature responsive and fixed resistance elements operatively associated in the bridge circuit by sliding contact arms which exhibit a nonlinear or other functional variability of their resistance value along the length in order to make it to correspond with the variability of the free area of the cooperating dampers necessary to make exact measurements of the true mixed temperatures.

A still further object of the invention is to provide a hot-wire anemometer type arrangement to actuate the corresponding displacement of the sliders in response to volume or velocity changes of the gas-streams whose temperature is to be measured.

A still other object of the invention is to provide a deflecting type vane anemometer arrangement to actuate the displacement of the sliders in response to changes in the velocity.

A further important object of the invention to provide a special bridge circuit arrangement operatively associated with velocity responsive resistance elements to provide the adjustment of the average temperature measurement in response to changes in the velocity of the gas-streams in eliminating all moving or sliding type elements from the novel system.

This is basically accomplished by the combination of a plurality of separate bridge circuits, two different points of each of which are interconnected into the measuring circuit through which the actual resultant effect is registered. Thus the intercombination of more bridge circuits has the specific advantage of coordinating a plurality of measurements of temperature and velocity wherein the adjustment of the relative effectiveness of the separate velocity measurements may be carried out without directly modifying the conditions of any other bridge circuit as required for accurate measuring of the average temperature.

It is a further additional object of the invention to use the arrangement of a plurality of bridge circuit combination for measuring the velocity of either one gas-stream or the average velocity of both streams or mixture by means of a switching operation connecting the same measuring device of various calibration to register merely the desired velocity without any specific alteration.

It is a final object of the invention to make certain simplifications in the arrangement of the bridge circuits to adapt it better to any particular application, therefore it is not limited to bridge circuits of the alternating or direct current types nor is it limited to use for measurements.

It is generally to be noted that there is no specific control means shown since the invention is related to a method for measuring the exact average temperature rather than to means employed for controlling the constancy of the entering mixed gas-temperature. However, it is to be understood that the resultant unbalance potential of the bridge output and its method of operation is representative only and thus the bridge circuit system is equally applicable to any type of commercial controllers operating under the action of the said resultant unbalance potential. Thus it may be employed, in combination, to provide an exact corrective change of the controlled factor in an attempt to return the departed variable to the exact desired value of the entering mixed gas-temperature, if so desired.

This invention possesses many other advantages and has several other objects which may be made more easily apparent from a consideration of some of the embodiments of the invention. For this purpose there is shown some representative forms in the drawings accompanying and forming part of the present invention. These forms will be now described in detail, illustrating the general principles of the invention; but it is to be understood that this detailed description is not to be taken in a limiting sense.

To the accomplishment of the foregoing and related ends, said invention then comprises the features hereinafter fully described and particularly pointed out in the claims, the devices, combinations and arrangements of parts hereinafter set forth to form various complete measuring devices and also it may include the various combinations and subcombinations of elements and their interrelation.

For fuller understanding reference will be made to the drawings, in which:

FIGURE 1 is a diagrammatic illustration of the measuring device as applied to a single blade damper system having a non-linear variability of the free areas along their angular run.

FIGURE 1A represents a bridge circuit diagram including all the measuring elements to operate in accordance with the principles of the invention forming a complete measuring device.

FIGURE 1B is an alternate modified arrangement employing potentiometers to provide an adjustment to any desired standard condition.

FIGURE 2 represents a "sine" function type potentiometer used in combination with the embodiment of FIGURE 1 to follow-up the sinusoidal variability of the free area of the dampers.

FIGURE 2A is another type of non-linear potentiometer having tapered sections and different spacing of the windings thereon.

FIGURE 3 is a diagrammatic illustration of another modified embodiment of the invention using a combination of hot-wire anemometer type arrangement to actuate the corresponding cooperating slider contact arms to provide an automatic adjustment of the resistance ratios to match with that of the volumes of both fluids.

FIGURE 4 is a diagram of an alternate modification of that described in FIGURE 3 using a deflector type anemometer device.

FIGURE 5 illustrates an arrangement of a dual-conduit system leading to a mixing compartment.

FIGURE 5A is a diagrammatic illustration of a specific embodiment of the invention generally applied to measuring the average temperature of two fluid streams of variable quantities with non-linear character being produced by two bridge circuits in series as required to automatically correct for the variations in the velocity of the fluid in either of the branch conduits.

FIGURE 5B illustrates an alternate embodiment of the bridge circuits to measure the average velocity of the mixture by using a separate switching means.

FIGURE 6 is a diagrammatic illustration of another modified arrangement of the invention using four bridge circuits in series and wherein the flow sensitive detector element comprises an electrically heated hot-wire resistor disposed in the flowpath of the fluid in each branch conduit.

FIGURE 7 is a diagrammatic illustration of a further modification of the embodiment of FIGURE 6 using only two bridge circuits containing all the measuring elements of FIGURE 6, thereby a considerable simplification is accomplished.

FIGURE 8 illustrates a plot diagram representing the relation of the variation of the resistance vs. flow rate.

FIGURE 9 represents a modified arrangement of the dual-conduit system having provision for widened portion to locate therein all the elements responsive to variable conditions.

FIGURE 9A shows an alternate arrangement and connection of the temperature sensitive resistance elements having only a group of two resistors in parallel.

FIGURE 10 is a fragmentary view of the application of a switching means for changing the measuring condition similar to that shown on FIGURE 5B.

FIGURE 11 shows diagrammatically an alternate type of measuring device to indicate the unbalance voltage resulting at the output of both bridges in series by using a balancing bridge which develops an opposing potential and thereby it indicates the extent of out of balance, which in turn, is representative of the average temperature of the fluid mixture.

Referring now particularly to FIGURE 1, there is shown, by way of example, a diagrammatic illustration of a preferred embodiment of the invention. In this embodiment one single blade type damper controls the gas-flow, therefore it is applied to the case when the cooperating and inversely operating dampers controlling the volume of both gas-streams exhibit a non-linear or any other functional variability of the free area along their angular run.

In this arrangement the temperature responsive resistance elements 3, 4 are located in proximity to their respective dampers 1, 2, to be exposed directly to the respective gas streams so as to quickly respond to any slightest variation of the temperature to which they are subjected and are electrically connected into a balanced bridge circuit. Slidable contact arms 7, 8 are disposed on said temperature responsive resistances 3, 4, engaging any variable point on their length to render operative any desirable portion thereof, and fixed resistors 5, 6 are similarly equipped with slidable contact arms 9, 10 mechanically interlocked with said arms 7, 8 to move together. Additional suitable interlocking means 11, 12 are disposed between the damper linkages 13, 14, respectively, and said slidable contact arm pairs to cause a simultaneous displacement.

FIGURE 1A is a schematic representation of an operating bridge circuit diagram including all the operative elements of FIGURE 1 to form a measuring device for the average temperature of the gas-mixture in accordance with the invention. This circuit basically includes a series-combination of the temperature responsive elements 3, 4, respectively of like value and length being connected into one arm A of a Wheatstone bridge circuit, the adjacent arm B of which includes a series combination of the fixed resistors 5, 6 and both said resistance pairs are adapted with said sliding contact arms 7, 8 and 9, 10, respectively to operate simultaneously, however, they are electrically isolated from each other as required for the correct operation of the bridge circuit. It has a suitable D.C. voltage source E connected across the junction points 17, 18 of the arms on opposite sides in the usual manner and designated by a — and a + sign at the respective points. The resistance elements 15 and 16 of the two opposite ratio arms C and D of the bridge are selected to be of equal and fixed value with non-sensitive character. Thus the arms of each side of the junctions form two shunt circuits across the proportioning measuring or control relay means 19 and each is divided by its connection to the current source E. Hence the bridge will be in electrical balance and no voltage drop will appear across the relay means 19 or bridge points 20, 21, when the temperature responsive resistances 3, 4 having their sliding arms adjusted to have their ratio correspond to the relative distribution of the respective gas-flows to which they are subjected under given standard mixed-gas temperature and at the same time to correspond to the adjusted ratio of the fixed resistors 5, 6.

In order to better clarify the operation of the bridge circuit we assume to have two gas streams $Q_1$ and $Q_2$ of different quantity and of different temperatures $T_1$ and $T_2$, respectively. Hence the average or resultant temperature of the mixture may be determined by the formula:

$$T_m = \frac{(T_1 \times Q_1) + (T_2 \times Q_2)}{Q_1 + Q_2} \quad (1)$$

Owing to the uniform proportionality characteristic of the temperature responsive electrical resistances with respect to the temperature, it has the general form:

$$R_o(1+at) \quad (2)$$

where $a$=temperature coef., and $R_o$ any given ohms at 0° F., and unit length. Also the respective gas-quantities may be denoted by unit volumes as follows: $Q_1=X_1$ unit volume and $Q_2=X_2$ unit volume. Hence the above expression (1), may be rewritten by the formula:

$$R_m = \frac{[R_o(1+aT_1)]X_1 + [R_o(1+aT_2)]X_2}{X_1 + X_2} \quad (3)$$

where $R_m$ denotes the resultant average resistance of the two temperature responsive resistance elements in series under given temperature of the respective gas-volume distribution.

The unit length and resistance value of the two fixed resistor elements 5, 6 is selected to be equivalent to that of the corresponding temperature responsive resistances under a given standard-mixed gas-temperature $T_{om}$ and is assumed to have a uniform temperature coef. of resistivity over a fairly wide range. By the simultaneous displacement of both cooperating sliding contact arms any portion of the respective elements may be short-circuited to match the relative distribution of the varying volumes of the respective gas-streams by said interlocking means being adopted to the corresponding dampers.

Thus under the above mentioned conditions given by the expression (3), the setting of the fixed resistors will correspond to the resistance values $R_oX_1$, $R_oX_2$, respectively. Accordingly, the difference of the resultant average resistances of both resistance pairs of the two adjacent bridge arms is given by the difference to the expression $R_m$ (Eq. 3) and $R_o(X_1+X_2)$ of the fixed resistors, as expressed by:

$$R_{om} = \frac{R_o(aT_{1o})X_1 + R_o(aT_{2o})X_2}{X_1 + X_2} \quad (4)$$

being mainly responsible for the creation of an unbalance-potential at the bridge points 20, 21, where $T_{1o}=T_1-T_o$, or $T_{2o}=T_2-T_o$, denote the deviation of the measuring temperature of the individual gas-streams from the selected standard temperature $T_o$.

As a conclusion, the value of $R_{om}$ will always represent and will always be proportional, under any variable temperature or volume conditions, to the prevailing true and accurate mixed gas-temperature which is measured in terms of electrical resistance value. This is accomplished by reason of the fact that by changing the total volume level of both individual gas streams, the total series resistance of the fixed resistors must change compensatorily by simultaneous displacement of their sliding arms and dampers to correspond to the changed relative distribution of the gas-streams and to the prevailing total volume level. As a result, the balance of the bridge is restored under standard mixed-gas-temperature conditions irrespective of the varying volume distribution of the respective gas streams.

It is to be noted that it is immaterial whether the unbalance of the measuring circuit occurs by way of an increase or decrease in the standard mixed temperature level, the unbalance voltage will always be of phase dependent upon the direction of unbalance and the resultant change of flow of current across the bridge points 20, 21 may be utilized, after amplification, to measure the exact mixed-temperature or to regulate the operation of any suitable means for the purpose of restoring the desired mixed-temperature. Thus it is apparent that if the actual level departs from the desired level, then an unbalance voltage exists between the representative level and that of the desired level, consequently the resultant voltage due to the change in the resultant series resistance of the elements 3, 4 is of phase and magnitude representative of the direction and extent of unbalance.

According to the principles of the invention, an exact measurement of the average temperature of a gas-mixture can be accomplished by means of a bridge circuit only if the displacement of the cooperating sliders controlling their respective resistance values is effected in strict correspondence with the relative distribution of the respective varying volume of both gas streams. Owing to the fact that in this particular embodiment the variation of the free area through each damper exhibits a sinusoidal or other non-linear characteristic along the angular run, it is apparent that in order to secure a strict correspondence between the relative magnitudes of the resistance pairs and corresponding volumes, it is of paramount importance that the incremental variation in the distribution of the resistance values along the length of both resistance pairs, 3, 4, and 5, 6, respectively, shall assume the same non-linear or functional-characteristic along their length in such manner as to in strict accordance with the non-linear variation of the free area of the corresponding dampers. If this necessary condition is satisfied, the proportionality relationship is established since the simultaneous operation is secured by the linkages 13, 14 as previously explained in connection with FIGURE 1.

There are various ways in which a potentiometer type resistance wire of non-linear variability or characteristics may be provided. In each case the type selected shall be the most suitable for the particular application.

FIGURE 2 represents, by way of example, a sine function potentiometer type arrangement generally indicated with the reference character 25. Such sine function follow-up potentiometer type arrangement may easily be obtained by the use of a square card with uniform winding 26 and a wiper 27 which moves in a circular path. The simplicity of this arrangement lies in the fact that it does not require any non-linear winding. This type of potentiometer, therefore, is particularly adapted to use in conjunction with single blade rotating dampers, as the case is in the embodiment of FIGURE 1, and the damper-linkages 13, 14 may easily be interconnected with the corresponding wiper for simultaneous rotative movement as required to exactly follow the sinusoidal variability of the free area of the damper in strict accordance with the resistance variation following the sine function since they are constrained to move equally and uniformly. It is, of course, to be understood that the temperature responsive resistances must similarly be composed to exhibit the same sine-function-variability being operatively associated with each other. The variable resistance values are obtained at the output terminals 28, 29 connected to the wipers. Further details are deemed unnecessary since this method is applied to work in combination with the principles of the invention.

FIGURE 2A shows another alternate arrangement of the non-linear type of potentiometer to be applied, in combination, with the embodiment of FIGURE 1, in accordance with the invention. This consists mainly of a resistant element which will conform to any particular required non-linear curve-characteristic and may constitute a plurality or preferably 3 sections are shown. As it may be observed it comprises two sections 30, 31 of different diameters joined by a tapered section 32 and the winding of wire on each section is made to vary the spacing in such a manner as to give the resistance element the desired non-linear distribution of its resistance value along its length, thereby to make it to correspond to the non-linear volume variation of the given damper arrangement along its angular run. A wiper, not shown here, is disposed in a suitable manner on the variable potentiometer arrangement to engage any point on said element which is interlocked with slidable contact arms for simultaneous displacement as required for an accurate operation of the measuring device in accordance with the invention. Above resistance element is only illustrative to show one of the many ways in which the desired nonlinear resistance characteristic curve may be achieved to operate in combination with the bridge circuit of the invention.

FIGURE 1B is alternate modification of the bridge circuit shown on FIGURE 1A, wherein the adjustable potentiometers 33, 34 are connected across the resistors 5, 6, respectively to shunt said resistors to manually and independently adjust their magnitudes to match any desirable change of the predetermined standard-mixed-gas temperature for which the bridge should be initially balanced. This adjustment is required in accordance with the invention in case of changing the desired standard mixed-gas-temperature level which, in turn, alters the initial value of the temperature responsive resistance elements in series with the ratio arm A. The usage of the above adjustable potentiometers is only tentative.

FIGURE 3 is a diagrammatic illustration of another modified embodiment of the invention using the combination of a hot-wire anemometer type arrangement to actuate the corresponding cooperating slider contact arms of the respective resistance pairs to provide the required automatic adjustment of the resistance ratios to match with the ratio of the corresponding variable gas-volume distributions. In this manner the interlocking means between the dampers and resistance-sliders could be eliminated.

This device uses the phenomenon that the heat removal from a wire heated by current depends on the velocity of the gas stream with a given temperature passing therethrough. Hence the temperature of the wire and its resistance may vary directly with the gas-velocity which is to be measured.

In this embodiment each of the resistance heaters 35, 36 is controlled by the variable gas-velocity and a thermal responsive bi-metallic element 37, 38 respectively, is located in proximity to the heater being energized in a conventional manner known in the art and ordinarily employed in connection with temperature controls. Each of the thermal responsive bimetallic elements is fixed to supports 39, 40, respectively, to one end, whereas their other free ends are mechanically connected with the slider arms 7, 8 and 9, 10, respectively, of FIGURE 1, through the links 41, 42, so that the movement of the bimetallic element due to temperature changes caused by the variation of the gas velocity will be transmitted to the slider with an approximate linear relationship. The operating temperature of the heater shall be selected comparatively high so as not to influence the accurate measurement of the gas-velocity by the possible variability of the respective gas streams within its range to be encountered in the practice. Also some shielding means must be provided to protect the temperature responsive resistance elements to be at least affected by the heat radiation of the hot-wire element.

FIGURE 4 represents a diagram of another alternate arrangement of that of FIGURE 3 wherein the actuation of the corresponding slider contact arms is effected by means of a deflecting vane anemometer type device generally indicated at 43. For the sake of simplification there is only one duct branch shown, and similar parts are indicated by like reference characters.

In the above device the passing gas exerts a pressure on the vane and causes a movement of the vane proportional to the variation of the gas-velocity which, in turn, is a measure of the volume of gas passing across the section of the duct.

The anemometer device 43, as shown, is to be located in either of the supply openings, only one is shown, and interlocking means 44 is provided to produce a simultaneous displacement with the cooperating slider contact arms 7, 8 and 9, 10, respectively, in accordance with the respective variation of the gas-volumes or velocity. The settings of this device shall be such as to traverse the duct for obtaining a true measuring of the average velocity and in relatively large ducts a good sensitiveness may be obtained within the required range of velocities usually encountered in practice. Since all other conditions are otherwise identical with that of FIGURE 3, no further description or details are given.

In each of the foregoing type of measuring devices certain moving parts or sliders are included. In many instances, however, it may be desirable to avoid the use of units which embody such moving parts or elements and thereby to avoid difficulties which eventually may accompany such arrangements.

It may further be noted that oftentimes it would be desirable to measure at the same time of the velocity and/or rate of flow of fluids being mixed in a common duct or pipe and thereby to determine the exact velocity of the mixture. The embodiment of the following figure will specifically be adaptable for simultaneously measuring both the mixed-temperature and mixed-velocity.

FIGURE 5A is a diagrammatic illustration of a specific embodiment of the invention generally applied to measuring the average temperature of two fluid streams of variable quantities with nonlinear character. As it has been pointed out, the two fluids, as shown on FIGURE 5, flowing through conduits 45, 46, respectively and thereafter they are joined together in a mixing compartment 47, wherein their temperature will be largely non-uniform and their mixing velocity will be unevenly distributed. Thus this embodiment provides an exact measurement of the variable quantities in the branch conduits, thereby to give an exact resultant average measurement by a special bridge circuit arrangement shown on FIGURE 5A.

This is basically accomplished by the series connection of two component bridges which will hereinafter be referred to as the series bridge network system wherein two different points of each of which are interconnected into the measuring circuit through which the actual resultant effect is registered. This intercombination of two component bridges has the specific advantage of coordinating a plurality of measurements of temperature and velocity wherein the adjustment of the relative effectiveness of the separate velocity measurements may be carried out without directly modifying the conditions of any other bridge circuit as required for accurate measurements of the average temperature of the mixture.

It is a function of the measuring unit to measure the physical value which is being controlled and to compare the measured value with a desired standard value. It is, however, often desirable to measure the values of such conditions as average-temperature, average-velocity or flow-rate, or pressure of a fluid mixture by measuring the electrical characteristics of condition sensitive elements responsive to above mentioned variables.

Thus in each bridge circuit there is a first element sensitive to the physical value of temperature of the fluid in one branch conduit and a second element sensitive to an associated physical value like velocity or pressure of the same fluid. Such first and second measuring elements are interconnected in such a manner that the associated physical value of velocity or flow-rate as measured by the second element introduces a bias into the bridge circuit including the first element of the same bridge and such bias effect may be reversed at a certain standard level of mixed temperature value, therefore such bias serving to vary or compensate for the velocity changes of the fluid components influencing the temperature-factor in each branch and thereby the average-temperature of the mixture.

Thus the measuring device or relay 62 arrangement measures the average temperature of the mixture in response of the unbalance potential created at the end terminal of both bridge circuits in series being the resultant algebraic sum of the unbalance voltage drops along both bridges in series including all measuring elements.

In this embodiment both bridge circuits BR1 and BR2 are independently energized by alternating current supplied from a transformer which includes a primary coil 49 and two secondary coils 50, 50A, being the direct energizing elements of said bridges associated with the energizing circuits. Each secondary coil feeds the potentiometer 64, 64A, respectively and the contact point of each slider 55, 55A is connected to the supply points or terminals 51, 51A whereas the opposite terminal points of the bridges 52, 52A are connected, respectively to the ends 56, 56A of the secondary coils.

In each of the bridge circuits in the form illustrated in FIGURE 5A, both component bridges are substantially identical both electrically and physically. Each of these bridges has the usual four interconnected arms including temperature responsive resistance elements 57, 57A connected, respectively, into the bridge arms C between terminals 52, 53 and 52A, 53A. Hence the corresponding parts of bridge BR2 are identified by the numbers used to identify the parts of bridge BR1 with the addition of the subscript A. Whilst the opposed arm A of each bridge circuit comprises a velocity or pressure sensitive resistance element of any selected coefficient of resistance and of the general type not based on heating or cooling effects as it will be described hereinafter. These elements 58, 58A, extending between terminals 51, 54 and 51A, 54A, respectively, while the adjacent arms B, D of each bridge comprise fixed impedance elements 59, 60 and 59A, 60A, respectively, as being suitable to use them in connection with A.C. bridge circuits.

The provision of A.C. excitation for the component bridges has the advantage of permitting the use of a single power supply source without interference and connecting any 60-cycle source or any oscillator type source of preferably 1000 cycles or any other suitable frequency. Therefore any variation in these excitation potentials will always be of equal proportion and of the same direction at the same time on both bridges so that any balanced or unbalanced potential will not be influenced by fluctuations of the exciting potential. Furthermore it will also permit the application of high impedance, high sensitivity electronic type balance indicator or measuring device of the unbalance, which in turn, may be employed in different measuring or control applications.

By virtue of the great characteristic differences existing in the features of both controlling sensitive resistance elements, they may vary from each other of the order of many times with respect to their magnitudes, thus the balancing impedances in the opposed or adjacent arms may similarly assume a corresponding ratio of the same order to provide the bridge balance under given standard predetermined mixed temperature condition.

As it is seen in this particular arrangement, the sensitive variable elements of both bridges are located in arms A and C and being exposed to the fluid flow in the respective branch conduits 45, 46 shown on FIGURE 5, leading to the mixing chamber 47 and common conduit 48, of the mixture. In case of selecting the temperature sensitive resistance elements of preferably high resistance character only a negligibly small amount of heat will be developed in this element and its temperature will practically not rise above the temperature of the fluid itself and it can, therefore, be located in flowing fluid stream since the following cooling produced by the flow will similarly be negligible. The temperature responsive elements, in the branch conduits, are so disposed as to assume substantially the same temperature and the magnitude of resistance with respect to surface area is proportioned so that the electric current flowing therethrough shall not raise its temperature above that of the fluid.

Potentiometer type variable resistance elements 63, 63A are connected, respectively, in series with the velocity sensitive elements 58, 58A, along which a contact moves to adjust the voltage drop on said element, thereby to adjust it to the characteristics of the temperature responsive elements. As a result it will adjust the relative effectiveness on the resulting unbalance potential by compensating for the velocity changes in the fluid of the respective branch conduits influencing the resulting average temperature of the mixture. Thus the element 57 in arm C measures the temperature of the component fluid in one branch whilst the other element 58 in the arm A compensates for any changes in the flow-rate encountered during variable conditions, which in turn, influences the resulting measurement of the average temperature of the mixture.

It is to be noted that in case both sensitive elements are of the same character of coefficient of resistance, which means that when flow increases the resistance also increases, and when temperature increases causing an increase of resistance of temperature sensitive element, both elements are to be located in the opposed arms A, C in order to produce the desired corrective results. This is achieved by the interconnection of the two bridges in series with the two terminals 54 and 53A, thereby any unbalanced voltage across the component bridge BR1 created across the terminals 53, 54 is impressed in series with the unbalanced voltage developed between terminals 53A, 54A of the component bridge BR2. The potentiometers in the secondary coil adjusting the amount of voltage supplied to both bridges, thereby it is possible to adjust the relative effectiveness of each bridge producing the total unbalance voltage representing the deviation of the average mixed-temperature from a standard predetermined temperature for which the bridge was initially balanced.

Accordingly, it operates in such a manner that bridge BR1 delivers a further-potential to bridge BR2 which produces an apparent bias on BR2 output depending on the variable conditions of temperature and velocity in BR1 determining the final average temperature of the mixture in combination with the temperature and velocity conditions in both conduits. The resulting unbalance potential corresponding to the exact average temperature is defined by the equations (1) and (3), based on the temperature and volume components of both fluids.

Another variable preset potentiometer 61, 61A is inserted in series with the arms B of both bridges, which is opposed to the temperature sensitive element serving the purpose to balance the bridge at any desired standard temperature of the fluid mixture.

It is to be understood that the manner in which the measuring device registers the change in the variable elements in response of the unbalance potential could be produced by various ways or by different means of re-establishing the balance, which in turn, is representative to the desired change in the variables, therefore no further details thereof are herein discussed since it forms no part of the present invention.

The series bridge network arrangement just described is particularly advantageous when used to measure in succession the mixed or average values of the temperature and average velocity condition sensitive elements of both component bridges by successively connecting them to a single measuring device and changing the calibration accordingly.

If, for example, it is only desired to measure the average rate of flow or velocity of the mixture fluid, the temperature sensitive element in the arm C in both bridges is to be replaced by fixed impedances and so the calibration of the measuring device may be adjusted for the indication of the velocity variable alone.

FIGURE 5B illustrates an alternate embodiment of the bridge circuits employing a switching means for changing the measuring conditions. Therefore only a fragmentary view is shown as being specifically referred to those parts being modified. Hence all the elements of the bridge circuits corresponding to elements already described in FIGURE 5 have been assigned the same reference numeral.

In this arrangement of the bridge circuits in lieu of the temperature responsive element another fixed impedance or resistor element is connected into the arm C by means of a switching device 66, 66A, respectively, and so the switch when closed connects the fixed resistor element 65 or 65A into the arm C to re-establish the bridge balance under given standard condition for velocity measurements alone having a single variable element 58, 58A in the arm A, of both bridges. The switching device of both bridges is mechanically interlinked and, in turn, further interlocked with the measuring device 62 to simultaneously reset the calibration for the velocity range, which means of resetting is not shown here.

It is to be noted that such changing of connections involves the use of some form of switching means which inherently may introduce variable contact resistance which would algebraically add to the impedance of the fixed resistor element 65 and it would influence the accuracy of the velocity or flow rate measurement to the extent of the variable switching resistance. Therefore this value of the contact resistance is also included to said fixed resistor 65 to compensate for this resistance variation when the initial balance is established.

Now referring back to FIGURE 5A wherein a pressure or velocity responsive resistance element of the non-heated type is employed and the bridge circuit arrangement is based on such an element not being responsive to any temperature. Such a pressure responsive resistance element indicated by the reference character 58 may, preferably, comprise a sponge rubber element with flexible insulating material containing air cells and being impregnated with carbon or other similar electrically conducting material to render it electrically conductive. Furthermore it may be surrounded with flexible rubber membrane or film which is impervious to gases or moisture. Within the element are bubbles of air which in response to changes in external pressure affect the cell internally and causes a change in the volume of the element which is accompanied by a corresponding change in electrical resistance. It is, of course, important that this element shall be constructed so that its velocity sensitive resistance-characteristic shall assume a substantially linear or straight function within the desired temperature and velocity range.

In the practical application some sort of probes may be disposed at two extreme points to make contact with the interior of the cell and thereby to establish two points for electrical connection. With suitable calibration the unbalance voltage or current will represent pressure or flow-rate. The main advantage of using such type of responsive elements lies in the fact the calibration and balance is unaffected by the temperature of fluid medium to be measured thereby it simplifies the circuit arrangement. Since such an element is used only, in combination, with the novel bridge circuit, no further description of the element is given.

FIGURE 6 is a diagrammatic illustration of another modified bridge arrangement of the invention in which the flow sensitive element comprises specifically an electrically heated resistor or detector element disposed in the flow path of the fluid in each branch conduit as required to provide the volume correction affecting the component fluid temperatures. By being exposed to the flowing fluid, the variation of the resistance due solely to change in velocity or flow rate depends on the cooling effect upon the hot wire detector element which is adaptable to measurements of relatively high velocity or flow-rate variation, therefore the temperature of the hot wire detector shall be maintained to a certain constant temperature differential above that of the fluid. Hence the magnitude of said hot wire detector-resistance depends both on the magnitude of electric power expended therein and on the mass flow of fluid thereover.

This is basically accomplished by the interaction of four bridge circuits in series and the measuring device measures the average temperature of the fluid mixture in response of the final unbalance potential being the algebraic sum of the unbalance voltage drops through the combined measuring elements included in all four bridges in series forming a combined series network arrangement. Accordingly, the resultant unbalance potential is a compound function of all four variable quantities such as temperature, velocity or mass flow of both fluid streams and may be expressed by the formula:

$$UP_r = f[(R_{t1}+R_{t2})(1+a_t t)+K(R_{v1}+R_{v2})(1+a_v V)] \quad (5)$$

wherein $R_{t1}$, $R_{t2}$ denotes the magnitude of the resistance per unit length under given standard temperature condition, $a_t$ is the temperature-resistance coefficient, whilst $R_{v1}$, $R_{v2}$ denotes the magnitude of resistance of the flow sensitive hot wire detector per unit length, $a_v$ is the sensitivity coefficient depending on the effect of rate of cooling, K is a proportionality factor adjusting the unbalance component voltage drops, the value of which depending on the desired relative effectiveness of the resistance variation due to velocity changes on the hot wire detector in relation to the resistance variation due to temperature changes of the temperature sensitive element, and V is the velocity of fluid flow. At first approximation it is assumed that the variation of the resistance of the hot wire detector is a straight line function of the flow rate and the necessary correction of which will be discussed hereinafter.

Hence each temperature-resistance variable factor is measured in the independent bridges BR1 or BR3 and corrected or compensated for changes in the flow-rate or velocity by the following bridges BR2 and BR4 containing the hot wire detector elements.

In this arrangement a two series bridge networks consisting of four bridges is a preferred illustration of the component unbalanced voltages due to all four variables affecting the final resulting average temperature of the fluid mixture.

In this combined bridge system all the four bridge circuits BR1, BR2, BR3, BR4 are independently energized by alternating current supplied from a transformer which includes a primary coil, not shown, and four secondary coils 68, 69, 68A, 69A, forming the direct energizing elements of said bridges associated with the energizing circuits. There are manually adjustable potentiometer type variable resistor elements 70, 71, 70A, 71A, respectively, connected in series with said secondary coils to render inoperative any part thereof, thereby to adjust the voltage appearing on the effective potentiometer in series with each secondary coil, which in turn, controls the magnitude of voltage applied on the corresponding bridge circuits. One end of the supply potentiometers is connected to the bridge terminals 72, 72A, 76, 76A, respectively, while the variable contact points of each potentiometer is connected to bridge terminals 73, 73A, 77, 77A, respectively.

At this point it is assumed that the flow sensitive hot wire detector element has a relatively high temperature coefficient of resistance and preferably the resistance is such that its magnitude varies substantially linearly with its temperature in the operating temperature range. It is also assumed that the velocity distribution of the fluid across the branch conduit is substantially uniform and regular, so a single length of wire extending across the conduit may be employed as illustrated on FIGURE 6.

Since the electric power is supplied to each bridge through a variable potentiometer, so by increasing its operative portion, the amount of current flowing in the various arms of the bridge circuits is thereby controlled. Accordingly, such adjustment changes the electric power dissipated or consumed in said hot wire detector in bridge circuits BR2 and BR4, thereby varying the temperature and magnitude of those hot wire detectors. The other impedance or resistor elements in each bridge circuit remain fixed because of their negligibly low temperature coefficient. Since the changes in the fluid mass flow over said hot wire detector elements is accompanied by corresponding changes in the rate of removal from said element, the thereby created component unbalance potential on the terminals of bridges BR2, BR4 is representative of the deviation of the flow rate from a predetermined standard value for which the corresponding bridges are initially balanced. The measuring of the component unbalanced potential is equivalent or proportional to the power required to maintain the initial constant temperature differential between fluid and said hot wire detector element.

In the bridges BR1, BR3, the temperature responsive elements 80, 80A are located in the arms A between terminals 72, 75, 72A, 75A, respectively and having fixed impedances or resistors 81, 82, 83, 81A, 82A, 83A, in the other arms B, C, D, respectively, whilst potentiometer type variable resistor elements 84, 84A are inserted in series with the arms D to adjust the balance of each bridge to any desired standard initial temperature condition in the branch conduits. The unbalance potential across the output terminals 74, 75, 74A, 75A of the individual bridge circuits BR1, BR3 is representative of the deviation of the fluid initial temperature in the respective branch conduits.

In the bridge circuits BR2 and BR4, the flow sensitive hot wire detector elements 85, 85A are located in the arms A between terminals 76, 79, 76A, 79A, respectively, and having similarly fixed impedance elements 86, 87, 88, 86A, 87A, 88A, in the other arms B, C, D, respectively, whilst potentiometer type fixed resistors 89, 89A are placed in series with the said fixed impedance elements in the arms D of bridge BR2 and BR4 to regulate the operative setting for any selected initial flow rate or balanced condition.

Since the unbalance potential of BR2, BR4 is corrective for flow-rate changes, their relative effectiveness in series may be adjusted by the setting of the voltage supply potentiometers 71, 71A, in series with the secondary coils.

Upon a flow of electric current through the hot wire detector element, its temperature and therefore its resistance assumes a value, such that the electric power dissipated or consumed in it is equal to the rate at which heat is given up by said detector element to the fluid in the conduit. At a given temperature of the fluid and at a particular temperature of the hot wire detector, the rate at which this element gives up heat to the fluid increases and decreases, respectively, with the mass flow variation of said fluid. Accordingly the unbalance potential due solely to flow rate variation causing a corresponding change in the resistance of said hot wire element, which is a measure of the flow rate.

The fixed impedances or resistors, however, have a negligibly low temperature coefficient of resistance, so variations in the current flow through these resistors have no effect on their magnitude or balance of the bridge circuit.

We assume as an illustration, a hot wire detector element having a high positive temperature coefficient of resistance and preferably the circuit design should be such that in the operating temperature range of the detector, the magnitude of its resistance varies substantially linearly with its temperature.

In the actual operation of the circuit, for example, an increase in the fluid mass flow through any of the branch conduits increases the rate at which said fluid removes heat from said detector element, whereupon the temperature and magnitude of said detector element decreases. This decrease in magnitude unbalances the bridge circuits BR2, BR4 having said detector elements in the branch conduits will create an unbalance potential in a direction and magnitude proportional and representative to the change in flow or velocity. Similarly a decrease in the fluid mass flow through said conduit decreases the rate at which said fluid cools said detector element, whereupon the temperature and magnitude of the resistance of said detector increases. This increase in magnitude of its resistance again unbalances the bridge creating an unbalance potential in the opposite direction. So the unbalance potential is always a measure of changes in the mass flow rate and the rate at which electric power is dissipated in said detector hot wire resistor element becomes a function of the fluid mass flow through the branch conduit.

In the foregoing description it was assumed that the response curve of the hot wire detector element used as a flowmeter has a straight-line curve characteristic. However, it is sloping downward because the cooling produced by the flow proceeds the temperature differential between the temperature of the hot wire detector and that of the fluid decreases and thus the rate of cooling becomes smaller and smaller, however, if means sensitive to flow be provided in the bridge circuits, which will increase the electric power supplied to the hot wire detector element, or to the entire bridge circuit and the detector included within as the fluid flow increases and substantially in proportion thereto, if the amount of increase is properly adjusted either by subjecting this flow sensitive means or by regulating the additional power supply by any means, then the decrease of cooling rate can be fully and exactly compensated by progressively increasing the temperature of the hot wire detector as the flow and its action on the detector element increases.

The full and dashed line curves of FIGURE 8 illustrate the relation between the resistance of the hot wire detector and mass flow of the fluid. The nature of the relationship may be varied to compensate for the changes in the cooling rate at various temperature differentials or various flow rates, as this is usually non-linear. For an accurate registration or indication it is of paramount importance to provide a straight line characteristic relationship, as it is shown with the full line curve.

Accordingly a flow sensitive auxiliary hot wire element 90, 90A of similar temperature-resistance character is inserted in series with coils 69, 69A of the secondary supply circuits of bridges BR2, BR4 and placed or exposed to the fluid stream as shown on FIGURE 6 or, if preferred, as shown on FIGURE 9 into a widened portion of the conduit. In such widened portion the linear velocity and cooling produced is somewhat lower. If desired, an additional decrease of the effect of the flow is actually done by adjusting the series potentiometer. Thus if the flow increases, the resistance of the said auxiliary hot wire detector element 90 in series with the supply source of the bridge is decreased, therefore a larger portion of the total available voltage drop through the effective total series potentiometer resistance will be applied to the bridge and also to the first main detector element. Thus as a result, as the flow increases, the unbalance voltage will be substantially increased due both to the increased bridge votage and higher hot wire detector temperatures.

Thus by addition of the series compensator or auxiliary hot wire element connected into the secondary supply circuit, the dashed line characteristic curves can be changed to any of them shown or to the full line curve of substantially linear character. The extent to which the shape of the full line curve of FIGURE 8 is modified by the addition of this series compensator element will largely depend on the magnitude and coefficient of resistance of this series compensator element, as well as on its variation in temperature with increase of fluid mass flow.

In the foregoing description it has been assumed that the temperature of the fluid entering the branch conduit to be constant and under such condition the measuring device operates to sense both the temperature and mass flow rate variation within the conduit. Thus if, at a constant fluid mass flow, the temperature of the fluid entering the conduit increases, then the hot wire detector will lose heat to said fluid at a slower rate so that the temperature and magnitude of said detector element will increase. As a result, the measuring device will erroneously indicate the unbalance potential in response of fluid flow rate variation. However, the bridge circuit may be automatically adjusted to correct or compensate for such changes in the fluid temperature. For this purpose the temperature sensitive resistance elements 91, 91A are located in the arms D of the bridges BR2, BR4 and connected, respectively, parallel to fixed impedances 88, 88A and their resistance may be automatically increased with increase in fluid temperature so that a higher magnitude of the hot wire detector element-resistance is necessary for the same unbalance potential to exactly indicate or measure the flow or vice versa. In this way the bridge circuit can be automatically adjusted with any changes in the temperature of the fluid so that the unbalance potential or the power dissipated in said detector provides an accurate measure of the fluid mass flow regardless of the temperature of the fluid.

Thus the automatic compensation for temperature changes may be accomplished by various ways or methods such as one type of illustration as given on FIGURE 9, wherein instead of varying the magnitude of the temperature sensitive resistance located in the arm D, it may be replaced by a parallel combination of four temperature sensitive elements 93, 93A of substantially like temperature-resistance characteristics to be located in a widened portion of the conduit shown on FIGURE 9, and it may preferably be immersed where the flow is not too large. With this parallel connection the voltage drop per resistance element is only a quarter of the total, practically no heating of the resistor element occurs. Now if the four individual elements, which make up this compensator for maintaining this constant temperature differential, are connected in parallel, the combined resistor in parallel is only a quarter of the resistance of each of them. The applied voltage to the resistors as a group and to the hot wire detector element are equal and the voltage drop or change of potential across each resistor may be a quarter of that across the detector element. So through each of the resistance passes about a quarter of the current passed by the detector and thus it receives only a $\frac{1}{16}$ of the power and consequently is only heated negligibly, and assumes substantially the same temperature as the fluid itself. It is further noted that the surface area relations is selected so that electric current of relatively small value flowing through does not raise its temperature above that of the surrounding fluid. By suitable selection it is easy to automatically vary the effect of the hot wire detector at which the correct unbalanced potential is indicated to become an accurate measure of the fluid mass flow regardless of the fluid temperature.

It is to be understood that if the fluid temperature is higher than the one at which the original calibration was made these resistor elements will be heated, their resistance will increase with the same characteristic as the hot wire detector which will also acquire a higher resistance, that is, at higher temperature.

The calibration is substantially determined by this temperature differential rather than by the absolute temperature. Thus this temperature differential between hot wire detector and that of the fluid will be maintained substantially the same irrespective of what the fluid temperature is within certain limits.

It will be apparent to those skilled in the art that in lieu of the group of resistors a single resistor of relatively large size as shown on FIGURE 6 and of different material may be employed to serve the same purpose, that should not be heated by the bridge currents.

It is important to note that if a thermistor of high sensitivity like any semi-conductor type element with negative temperature characteristic is used as a hot wire detector element, the temperature sensitive resistance element to be applied for compensation of the temperature differential aforesaid must be selected to assume substantially the same characteristic in order to perform the desired compensation by locating it in the arm D.

FIGURE 7 is a diagrammatic illustration of an alternate embodiment of the combined bridge network shown on FIGURE 6. The basic characteristical difference lies in reducing the number bridge circuits to two which, therefore, contain all the measuring elements of the two series bridge networks having four-bridge circuits, thereby a considerable simplification has been accomplished. The two bridge circuits to be generally indicated with the reference characters BR5 and BR6.

Under the assumption that the temperature responsive resistance elements possess substantially identical temperature-resistance characteristic with that of the flow sensitive hot wire detector elements, the said temperature sensitive elements 80, 80a of bridges BR1, BR3, respectively are now located in the arms C between terminals 96, 97, 96A, 97A, respectively of the bridges BR5, BR6. The basic purpose of connecting them in the opposed arms in relation to said hot wire detector element is to produce an algebraic addition of the unbalanced voltages being proportional to both the temperature and flow rate variation in both branch conduits as being defined in Equation 5 previously described.

All the elements already described in FIGURE 6 have been indicated by like reference characters.

It may be observed that the flow sensitive auxiliary hot wire elements in series with the secondary coils will vary the applied voltage also to the left arms having the temperature sensitive elements in arm C. However, this variation will not influence the relative balance and correct measuring of this element since the magnitude of its resistance is selected such that practically no heating of this element takes place by electric current and that it remains at substantially fluid temperature level.

For the purpose of adjusting the initial balance of the two bridges to any standard mixed-temperature condition, additional potentiometer type variable fixed resistors of non-sensitive character denoted by 99, 99A, are connected, respectively into the arms B.

Since the operation of this two-bridge network is otherwise identical to that of the aforesaid four-bridge system of FIGURE 6, further description is deemed unnecessary.

FIGURE 8 illustrates a plot diagram representing the relation of the variation of resistance vs. flow rate of the hot wire detector element. As previously explained in a greater detail in connection with FIGURE 6, the characteristic nature of this relation could be varied by various suitable control means. One illustrating example of this means shown on FIGURE 6 is to locate a flow sensitive auxiliary element in the secondary supply line to vary the applied voltage on this detector element, thereby an approximate straight-line curve may be obtained as shown by the full-line curve on FIGURE 8 as assumed and defined by Equation 5.

FIGURE 9 represents a modified arrangement of the dual-conduit system having all the measuring elements located therein. In this arrangement each of the branch conduits is made to have a widened portion 100, 100A, for placing therein a group of four temperature sensitive elements 93, 93A connected parallel and such as to replace elements 80, 80A of bridges BR1, BR3 in arm A and also another group of four temperature responsive resistances 102, 102A, in parallel to replace the temperature sensitive elements of arm D of bridges BR2 and BR4.

Those elements, preferably, may be placed closer to the walls where they are at least subjected to fluid flow to sense solely the temperature variation of the fluid for the measurement in each branch conduit. It is also shown that the flow sensitive auxiliary elements 90, 90A, may be located in the widened portion of the conduit, if so desired, to reduce its effectiveness.

FIGURE 9A shows an alternate modification of the resistor arrangements in the widened portion of the conduit. It mainly differs from that shown on FIGURE 9 in that each group of temperature sensitive elements consists only of two-elements in parallel. Accordingly the parallel combination of resistors 103, 103A replaces the group of elements 93, 93A, whilst the parallel combination of resistors 104, 104A replaces the group of elements of arm D.

FIGURE 10 is a fragmentary view of the application of a switching means for changing the measuring conditions similar to that shown on FIGURE 5B. Thus all the elements already described has been indicated by like reference numerals.

In case of using the same measuring device to measure both the average velocity and average temperature of the fluid mixture, the bridge circuits of FIGURE 7 are modified such that the switching means 106, 106A will alternately insert the temperature sensitive resistor or fixed resistor element 107, 107A of predetermined magnitude in series with the arm C depending on whether the average temperature or flow is to be measured.

Both switching means 106, 106A are mechanically interlocked and also interlocked with the measuring device 62 to produce a change in the calibration corresponding to the position of said switching means. The setting arrangement for the calibration is not shown here as it forms no part of the present invention.

FIGURE 11 shows diagrammatically an alternate type of measuring device to indicate the unbalance voltage resulting at the output of both bridges in series. It is generally to be noted that the manner in which the measuring device indicates the extent of the out of balance or unbalance potential representative of the final resultant average mixed-temperature, this invention is obviously not limited to any specific form of such indicating devices.

This indicating system is basically arranged to have a balancing bridge in order to oppose a voltage equivalent to the unbalance potential of the resulting bridge outputs of BR5 and BR6 and thereby to indicate the extent of out of balance, which in turn, is representative of the average temperature of the fluid mixture.

In this measuring arrangement the bridges BR5 and BR6 of FIGURE 7 are shown by using the identical reference characters. Since the operation of the bridge circuits of FIGURE 11 is completely analogous to the operation of these circuits as described in FIGURE 7, it is believed that further description is unnecessary.

Furthermore there is shown a balancing-bridge generally indicated at BR7 and a balancing indicator denoted by reference numeral 110. The balancing bridge comprises a standard bridge circuit formed of four arms of approximately like impedances 111, 112, 113, and 114 connected all in series in the conventional form of any type of Wheatstone bridge circuit. The impedance 114, however, is manually variable like a potentiometer element which may be adjusted to vary the balance condition of this bridge.

The balancing bridge BR7 similar to bridge BR5 or BR6 may be energized by an alternating current source by a separate secondary coil, not shown here, connected to the input terminals 115, 116, respectively, or by any other type of electric power source. This balancing bridge, therefore, may develop across its output terminals any desired magnitude of voltage of either direction and depending on the adjustment of the potentiometer 114.

The output terminals 117, 118 of the balancing bridge is interconnected in series with the output terminals 96 of bridge BR5 and output terminal 98A of bridge BR6 through said balance indicator 110 forming a closed circuit. In this manner the resulting unbalance voltage appearing across the end terminals of both said bridges BR5, BR6 is impressed in series with any unbalanced voltage developed across terminals 117, 118 of the balancing bridge. As a result, the voltage across the terminals of the balancing bridge acts to oppose the unbalance potential across terminals 96, 98A. Thereby it will indicate when both potentials are equal. Likewise it will become a measure of the unbalance potential being representative of the average temperature of the fluid mixture. This measurement may be obtained by the adjustment of said potentiometer 114 of the balancing bridge being necessary to produce an indication of balance on said indicating means 110.

It shall generally be noted that the energizing of the bridge circuits described herein may be accomplished by any type of D.C. power supply, provided there is provision for independently energizing said bridge circuits.

It is further to be noted that the term "fluid" mentioned in the latter part of this application is referred to both gas or liquid, since the bridge arrangements of FIGURES 5, 6, 7, are equally adaptable to either of these fluids.

What I claim and desire to secure by Letters Patent of the United States is:

1. An electric measuring device for detecting the variation of the exact average temperature of fluid mixtures having two branch conduits for the passage of said fluids with means provided to produce any desired proportion of the volumes of said respective fluid streams flowing therethrough into a mixing chamber having two supply openings leading thereto, comprising in combination, two balanceable component bridge circuits each of which having a pair of input and a pair of output terminals, a source of electric potential for independently energizing said component bridges through said input terminals, and direct conductive connections between said output terminals of each component bridge and the output circuit of each of the succeeding component bridges to form a series balanceable bridge network, a number of resistor elements with high temperature coefficient of resistance located in said branch conduits and connected with the arms of said component bridge circuits, said resistor elements of high temperature coefficient being responsive to two different variable conditions within said fluid streams such as temperature and associated physical value of flow rate, and at least one of said temperature responsive elements in each of said component bridges being heated by the current from said source to a predetermined temperature and exposed to the motion of the fluid that is being measured in each of said branch conduits, electric current connection between said resistor elements of high temperature coefficient of each component bridge and said series balanceable bridge network, including means adjustable to independently vary the electric power supplied to each of said component bridges controlling their relative effectiveness without affecting their respective balance conditions, thereby said resistors sensitive to fluid motion introduce a corrective change in the relative resultant resistance value of each of said component bridges in strict correspondence with the variation in the flow rate of the respective fluid streams to which they are subjected, the said two condition responsive resistor elements controlling the resultant unbalance potential on the output terminals of said series bridge network in accordance with the average temperature of the fluid streams in both said branch conduits, said unbalance potential representing a condition when the average temperature of the fluid mixture departs from a predetermined standard value, and including means for indicating the degree of unbalance produced by the resultant resistance changes of the respective resistance elements of high temperature coefficient in said series bridge network, thereby to obtain an exact measurement of the average temperature of the fluid mixture irrespective of the thoroughness of the mixing of both said fluid streams in said mixing chamber.

2. An electric measuring device for detecting the variation of the exact average temperature of fluid mixtures with two branch conduits for the passage of fluids having a balanceable series bridge network of two component bridges and power source of the character described, each of the two component bridges of said network comprises a Wheatstone bridge circuit having resistor elements constituting arms connected to said independently energizing power source, said resistors including a predetermined temperature characteristic resistor means of flow sensing character located in each of said branch conduits and each connected in one arm of said bridges and heated at a given balance to a predetermined higher temperature than the respective fluid temperature under standard condition and exposed to the fluid in motion, and said resistor elements further including temperature sensitive resistance means connected in the adjacent bridge arms each of which being located in the respective branch conduits in a given spaced relation to the first mentioned resistor means and exposed to the respective fluid stream and only negligibly heated by the current from said source, thereby to compensate for variations in fluid temperature in order to maintain a predetermined constant temperature differential between the respective fluid and said associated flow sensitive resistor for correctly measuring the variation of fluid flow rate regardless of such temperature variation as required to bias the said component bridges with a corrective voltage proportional to the variation of fluid flow rate, thereby to provide a resultant unbalance potential representing the exact average temperature of fluid mixture under any variable conditions of temperature and fluid flow rate.

3. An electric measuring device for detecting the variation of the exact average temperature of fluid mixtures with two branch conduits for the passage of fluids having a balanceable series bridge network of two component bridges and power source of the character described, said power source having provision to independently energize each of said component bridges of said bridge network, each of the independent bridges of said network comprises a Wheatstone bridge circuit having resistor elements constituting arms connected to said independently energizing power source, said resistors including a predetermined temperature coefficient resistor means of flow sensing character located in each of said branch conduits and at least one additional resistor element of flow sensitive character heated to a predetermined temperature by the current of said energizing source being located in each of said branch conduits and exposed to the respective fluids in motion controlling the change of its resistance value substantially proportional to the variation of fluid flow rate, each of said additional flow sensitive resistors connected in series with the respective electric power supply circuits of the respective component bridge circuits containing the said first flow sensitive resistor element connected into the arms thereof, thereby to serve as an adjusting means individually associated with the respective component bridge circuits to adjust the current supplied through said first flow sensitive element in said respective component bridge circuits controlling its resistance value in such a manner as to compensate for the non-linear variation in response of said first flow sensitive resistor element with change in flow rate, whereby to introduce an accurate corrective bias voltage in said respective component bridge circuits in strict correspondence with the variation of the flow rate which is being measured in order to adjust the resultant unbalance potential for the exact measurement of the average temperature of said fluid mixture, said adjusting means may be effected without influencing the balance of the bridge circuits not including said first flow sensitive resistor element.

4. An electric measuring device for detecting the variation of the exact average temperature of fluid mixtures having two branch conduits for the passage of said fluids with means provided to produce any desired proportion of the volumes of said respective fluid streams flowing therethrough into a mixing chamber having two supply openings leading thereto, comprising in combination, a transformer having a primary coil and two secondary coils, said primary coil being associated with a source of alternating current power, two balanceable component bridge circuits each of which having a pair of input and a pair of output terminals, each of said secondary coils being connected to the input terminals of said respective bridge circuits and direct conductive connection between said output terminals of each component bridge and the output circuit of the succeeding component bridge to form a series of balanceable bridge network, a separate adjustable potentiometer resistor in series with each of the secondary supply circuits each having an adjustable tap connected to one of said input terminals for independently varying the electrical voltage delivered to the arms of each of said bridge circuits controlling the relative effectiveness of the respective bridges in series, a first temperature sensitive resistance element located in each of said branch conduits and connected to one arm of said first and second component bridge circuits and variable in response to variation in temperature of the fluid flowing thereover, a first flow sensitive resistor element located in each of said branch conduits and connected in the opposed arm of said first and second component bridge circuits heated to a predetermined higher temperature than that of fluid being respectively exposed to the motion of fluid in said respective branch conduits and controlled by the rate of cooling proportional to the variation in flow rate, a second temperature responsive resistance element of similar resistance characteristic to that of the first flow sensitive resistor element located in each of said branch conduits and connected to an adjacent arm of said first and second bridge circuits to compensate for the change in fluid temperature from a predetermined standard value for securing a correct response of said first flow sensitive resistor element irrespective of fluid temperature variation, the operation of said first flow sensitive resistor element in said bridges introduce a corrective bias voltage on the resultant unbalanced voltage in strict correspondence with the variation in flow rate of the respective fluid streams to which they are subjected, a separate second flow sensitive resistor element of similar temperature resistance character located in each of said branch conduits to be exposed to said respective flows in motion being responsive to said changes in flow rate and connected in the current supply circuits of said first and second bridge circuit to vary the current flow through said first flow sensitive resistor element to compensate for its non-linear response to change in flow rate or rate of cooling, two potentiometer type variable resistors connected in the adjacent arm of each of said bridge circuits to adjust the initial balance to any predetermined standard condition of temperature and flow rate of both said fluids, one fixed non-responsive resistor element connected in each of the fourth arm of said bridge circuit, the said two condition responsive elements in both said branch conduits controlling the resultant unbalance potential on the output terminals of said series bridge network in accordance with the average temperature of the fluid streams in both said branch conduits, said unbalance potential representing a condition when the average temperature of the fluid mixture departs from a predetermined standard value, and including means for indicating the degree of unbalance produced by the resultant resistance changes of the respective measuring elements in said series bridge network, thereby to obtain an exact measurement of the average temperature of the fluid mixture irrespective of the thoroughness of the mixing of both said fluid streams in said mixing chamber.

References Cited by the Examiner

UNITED STATES PATENTS

| | | | |
|---|---|---|---|
| 1,437,626 | 12/22 | Wilson | 137—5 |
| 2,815,480 | 12/57 | Ruge | 73—83.5 |
| 2,944,422 | 7/60 | Wald | 73—342 |

ISAAC LISANN, *Primary Examiner.*